US011710157B2

(12) United States Patent
Lewis et al.

(10) Patent No.: US 11,710,157 B2
(45) Date of Patent: *Jul. 25, 2023

(54) METHODS, SYSTEMS, AND MEDIA FOR PRESENTING AN ADVERTISEMENT THAT FACILITATES THE PURCHASE OF CONTENT ASSOCIATED WITH AN APPLICATION

(71) Applicant: Google LLC, Mountain View, CA (US)

(72) Inventors: Justin Lewis, South San Francisco, CA (US); Ruxandra Georgiana Paun, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 17/340,488

(22) Filed: Jun. 7, 2021

(65) Prior Publication Data
US 2021/0295393 A1 Sep. 23, 2021

Related U.S. Application Data

(63) Continuation of application No. 14/301,867, filed on Jun. 11, 2014, now Pat. No. 11,030,659.

(51) Int. Cl.
*G06Q 30/02* (2023.01)
*G06Q 30/0241* (2023.01)
*G06Q 30/0601* (2023.01)

(52) U.S. Cl.
CPC ..... *G06Q 30/0277* (2013.01); *G06Q 30/0635* (2013.01)

(58) Field of Classification Search
CPC .................. G06Q 30/0277; G06Q 30/0635
See application file for complete search history.

(56) References Cited

U.S. PATENT DOCUMENTS

| | | | |
|---|---|---|---|
| 9,710,807 B2 | 7/2017 | Theurer et al. | |
| 10,853,864 B1 * | 12/2020 | Kotas | G06Q 30/0641 |
| 11,030,659 B1 * | 6/2021 | Lewis | G06Q 30/0277 |
| 11,087,390 B1 * | 8/2021 | Hiatt | G06Q 30/0643 |
| 11,132,711 B2 * | 9/2021 | Tseng | G06Q 50/01 |
| 11,157,955 B2 * | 10/2021 | Yan | G06Q 30/0255 |
| 11,348,144 B2 * | 5/2022 | Unnikrishnan | G06Q 30/0271 |

(Continued)

OTHER PUBLICATIONS

Notice of Allowance dated Feb. 4, 2021 in U.S. Appl. No. 14/301,867.

(Continued)

*Primary Examiner* — Michael I Ezewoko
(74) *Attorney, Agent, or Firm* — Byrne Poh LLP

(57) ABSTRACT

Methods, systems, and media for presenting an advertisement are provided. In some embodiments, the method comprises: causing an advertisement to be presented in connection with presentation of a video having content associated with an application, wherein the advertisement includes information indicating one or more virtual items associated with the application available for purchase; receiving a user input indicating a purchase of at least one of the one or more virtual items; causing payment information to be collected based on a user account associated with a request for presentation of the video to complete the purchase; and transmitting information indicating the completed purchase to an entity associated with the application.

21 Claims, 7 Drawing Sheets

(56) References Cited

U.S. PATENT DOCUMENTS

| | | | |
|---|---|---|---|
| 11,379,882 B2 * | 7/2022 | Son | G06Q 30/0275 |
| 11,481,942 B2 * | 10/2022 | Geivett | G06Q 30/0269 |
| 11,490,147 B2 * | 11/2022 | Almeida | H04N 21/4316 |
| 11,538,069 B1 * | 12/2022 | Shapiro | G06Q 30/0276 |
| 2003/0149781 A1 | 8/2003 | Yared et al. | |
| 2008/0109844 A1 | 5/2008 | Baldeschwieler et al. | |
| 2011/0288932 A1 | 11/2011 | Marks et al. | |
| 2012/0036003 A1 * | 2/2012 | Tong | H04W 4/60 705/14.39 |
| 2012/0116897 A1 | 5/2012 | Klinger et al. | |
| 2012/0265595 A1 * | 10/2012 | Corner | G06Q 30/02 705/14.23 |
| 2013/0159103 A1 | 6/2013 | Foroughi et al. | |
| 2013/0304584 A1 * | 11/2013 | McCoy | G06Q 30/02 705/14.66 |
| 2014/0229331 A1 * | 8/2014 | McIntosh | G06Q 30/0613 705/26.41 |
| 2014/0274307 A1 * | 9/2014 | Gonzalez | A63F 13/655 463/25 |
| 2014/0304071 A1 * | 10/2014 | Manafy | G06Q 30/0255 705/14.53 |
| 2014/0358697 A1 * | 12/2014 | Irwin | G06Q 30/0275 705/14.71 |
| 2015/0186913 A1 | 7/2015 | Mann et al. | |
| 2016/0110526 A1 * | 4/2016 | Abramson | G06F 21/10 705/59 |
| 2016/0180394 A1 * | 6/2016 | Tseng | G06F 16/29 705/14.58 |
| 2016/0275554 A1 * | 9/2016 | Yan | G06Q 30/0255 |
| 2019/0172098 A1 * | 6/2019 | Lewis | G06Q 30/0269 |
| 2020/0242668 A1 * | 7/2020 | Son | G06Q 30/0275 |
| 2021/0012391 A1 * | 1/2021 | Unnikrishnan | G06N 20/00 |

OTHER PUBLICATIONS

Office Action dated Jan. 25, 2019 in U.S. Appl. No. 14/301,878.
Office Action dated Jan. 29, 2018 in U.S. Appl. No. 14/301,867.
Office Action dated Feb. 7, 2019 in U.S. Appl. No. 14/301,867.
Office Action dated Feb. 21, 2018 in U.S. Appl. No. 14/301,878.
Office Action dated Mar. 11, 2016 in U.S. Appl. No. 14/301,867.
Office Action dated Mar. 22, 2016 in U.S. Appl. No. 14/301,878.
Office Action dated Jul. 13, 2017 in U.S. Appl. No. 14/301,867.
Office Action dated Jul. 27, 2017 in U.S. Appl. No. 14/301,878.
Office Action dated Oct. 6, 2016 in U.S. Appl. No. 14/301,867.
Office Action dated Oct. 6, 2016 in U.S. Appl. No. 14/301,878.
Office Action dated Oct. 21, 2019 in U.S. Appl. No. 14/301,867.

* cited by examiner

METHODS, SYSTEMS, AND MEDIA FOR PRESENTING AN ADVERTISEMENT THAT FACILITATES THE PURCHASE OF CONTENT ASSOCIATED WITH AN APPLICATION

CROSS-REFERENCE TO RELATED APPLICATION

This application is a continuation of U.S. patent application Ser. No. 14/301,867, filed Jun. 11, 2014, which is hereby incorporated by reference herein in its entirety.

TECHNICAL FIELD

The disclosed subject matter relates to methods, systems, and media for presenting an advertisement that facilitates the purchase of content associated with an application.

BACKGROUND

Many users interact with applications, such as games, on their mobile phones, tablet computers, laptops, etc. These applications often have virtual content which can be purchased by users. For example, games often have content that is available for purchase, and these purchases can typically only be made from within the application.

Accordingly, it is desirable to provide new methods, systems, and media for presenting an advertisement that facilitates the purchase of content associated with an application.

SUMMARY

Methods, systems, and media for presenting an advertisement are provided. In accordance with some embodiments of the disclosed subject matter, a method for presenting an advertisement is provided, the method comprising: causing an advertisement to be presented in connection with presentation of a video having content associated with an application, wherein the advertisement includes information indicating one or more virtual items associated with the application available for purchase; receiving a user input indicating a purchase of at least one of the one or more virtual items; causing payment information to be collected based on a user account associated with a request for presentation of the video to complete the purchase; and transmitting information indicating the completed purchase to an entity associated with the application.

In accordance with some embodiments of the disclosed subject matter, systems for presenting an advertisement are provided, the systems comprising: a hardware processor that is programmed to: cause an advertisement to be presented in connection with presentation of a video having content associated with an application, wherein the advertisement includes information indicating one or more virtual items associated with the application available for purchase; receive a user input indicating a purchase of at least one of the one or more virtual items; cause payment information to be collected based on a user account associated with a request for presentation of the video to complete the purchase; and transmit information indicating the completed purchase to an entity associated with the application.

In accordance with some embodiments of the disclosed subject matter, non-transitory computer-readable media containing computer executable instructions that, when executed by a processor, cause the processor to perform a method for presenting an advertisement, the method comprising: causing an advertisement to be presented in connection with presentation of a video having content associated with an application, wherein the advertisement includes information indicating one or more virtual items associated with the application available for purchase; receiving a user input indicating a purchase of at least one of the one or more virtual items; causing payment information to be collected based on a user account associated with a request for presentation of the video to complete the purchase; and transmitting information indicating the completed purchase to an entity associated with the application.

In accordance with some embodiments of the disclosed subject matter, a system for presenting an advertisement is provided, the system comprising: means for causing an advertisement to be presented in connection with presentation of a video having content associated with an application, wherein the advertisement includes information indicating one or more virtual items associated with the application available for purchase; means for receiving a user input indicating a purchase of at least one of the one or more virtual items; means for causing payment information to be collected based on a user account associated with a request for presentation of the video to complete the purchase; and means for transmitting information indicating the completed purchase to an entity associated with the application.

In some embodiments, the means for transmitting information indicating the completed purchase comprises means for sending a remote procedure call.

In some embodiments, the means for transmitting information indicating the completed purchase comprises means for redirecting the user to a site associated with the application.

In some embodiments, the system further comprises means for receiving one or more advertising parameters associated with the application, wherein the one or more advertising parameters indicate the one or more virtual items available for purchase.

In some embodiments, the one or more advertising parameters indicate one or more visual characteristics associated with the one or more virtual items, and the one or more visual characteristics are used in presentation of the one or more virtual items in the advertisement.

In some embodiments, the system further comprises means for determining that the user has a virtual currency balance associated with the application sufficient to purchase at least one of the one or more virtual items.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
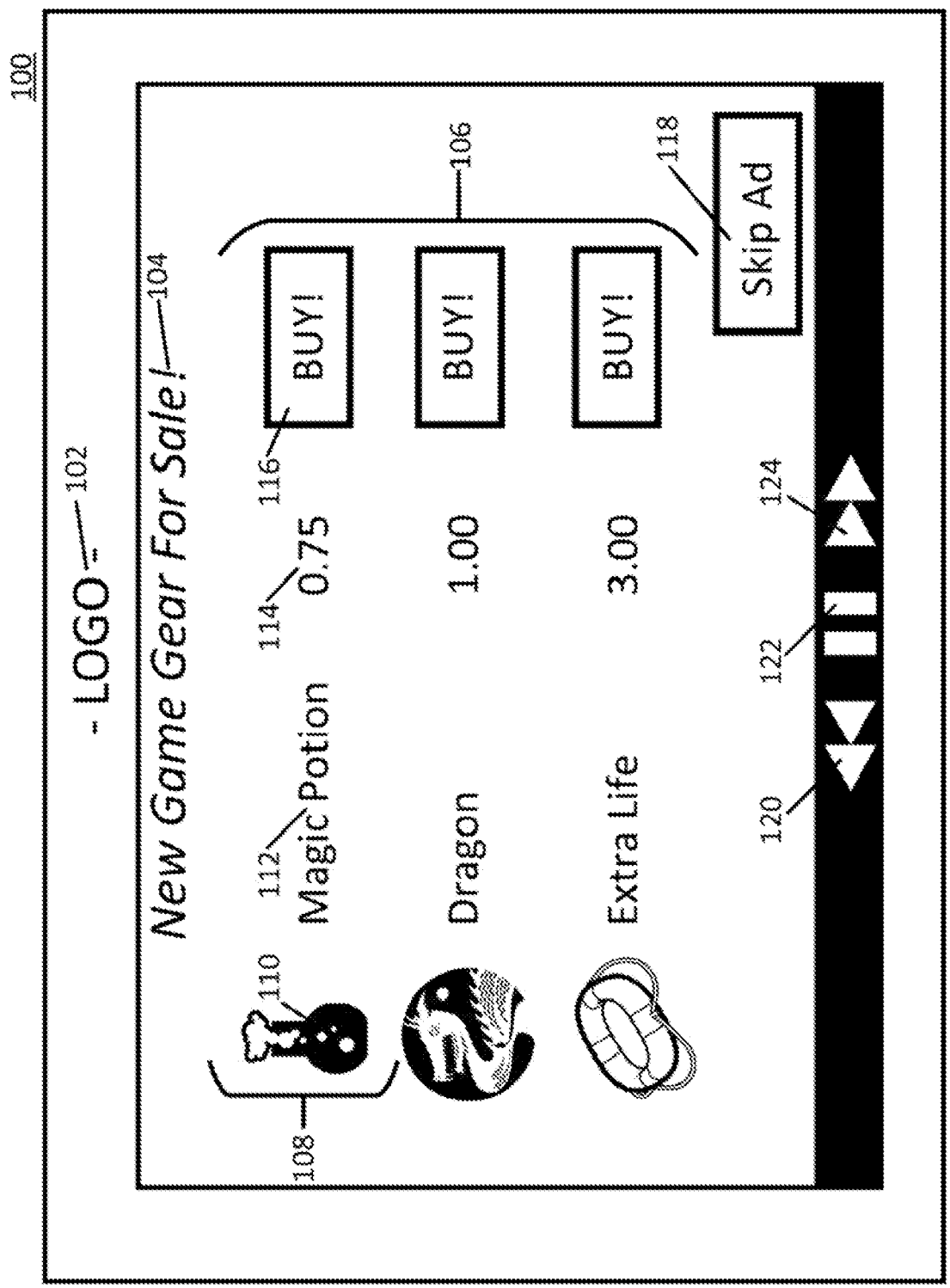
FIG. 1 shows an example of a user interface for presenting an advertisement with virtual items available for purchase in accordance with some embodiments of the disclosed subject matter.

In accordance with various embodiments, mechanisms (which can include methods, systems, and media) for presenting an advertisement that facilitates the purchase of content associated with an application are provided.

In some embodiments, the mechanisms described herein can determine whether an advertisement associated with an application is to be presented to a user. Upon determining that the advertisement associated with the application is to be presented, the mechanisms can cause an advertisement containing one or more virtual items associated with the application that are available for purchase through the advertisement to be presented. In some embodiments, the application with which the advertisement is associated can include a game, a streaming media player, an e-book reader, and/or any other suitable program that is executed by a user device. In some embodiments, the one or more virtual items associated with the application can include content associated with a game, content related to the application (e.g., related books, related videos, related music, and/or any other suitable related content), one or more other applications related to the application (e.g., a related game), and/or any other suitable virtual items.

In some embodiments, the mechanisms described herein can determine whether an advertisement is to be presented based on information relating to how an application has been used. For example, in some embodiments, the mechanisms can determine whether the application has been installed on a device associated with the user, how recently the application has been used, how frequently the application has been used, and/or any other suitable information. Additionally or alternatively, in some embodiments, the mechanisms described herein can determine whether an advertisement is to be presented based on whether the user is associated with a particular electronic payment system through which a purchase of a virtual item presented in the advertisement is to be processed.

In some embodiments, a virtual item presented in the advertisement can be selected for purchase by a user, and can be credited to an account associated with the application corresponding to the advertisement. In some embodiments, the mechanisms described herein can coordinate and/or process a payment for a selected virtual item. For example, in some embodiments, the mechanisms described herein can cause a user interface requesting payment information from a user to be presented. As another example, in some embodiments, the mechanisms receive payment information, authenticate the payment information, and update an account associated with the user to reflect the purchase of the virtual item(s).

Note that, in instances where the mechanisms described herein use information related to a user's interaction with a particular application, the mechanisms can, in some embodiments, request consent from the user. For example, in some embodiments, consent can be acquired by requesting that the user log in to an account from which information is to be used. In some embodiments, a user can specify that certain information (e.g., how often a user interacts with a particular application, and/or any other suitable information) is not to be stored and/or used. Additionally or alternatively, in some embodiments, the information can be encoded in any suitable manner. For example, in some embodiments, the information can be encoded to correspond to a randomized identification number which does not contain any personal information, such as the user's name, location, and/or any other suitable personal information.

The mechanisms described herein can be put to a variety of uses. For example, in some embodiments, an application provider can provide a user of the application an opportunity to buy virtual content associated with the application from outside of the application itself by including the virtual content as purchasable content in an advertisement which is presented outside of the application. As a more particular example, in some embodiments, the application provider can allow the user of the application to purchase virtual content from a device other than the device on which the application is installed. As another example, in some embodiments, an application provider can provide input used to create the advertisement in which the virtual content available for purchase is advertised. In such embodiments, the application provider can specify advertising parameters and/or criteria that can be used to determine whether an advertisement related to the application is to be presented to a particular user. In some embodiments, these parameters and/or criteria can be used to determine the appearance of the advertisement.

Turning to FIG. 1, an example 100 of a user interface for presenting an advertisement containing indications of virtual items available for purchase is illustrated in accordance with some embodiments of the disclosed subject matter. As shown, in some embodiments, user interface 100 can include a logo 102, a title 104, a collection of virtual items 106, a skip advertisement element 118, and one or more video player controls, such as a rewind element 120, a pause element 122, and/or a fast-forward element 124.

Note that, in some embodiments, user interface 100 can be an advertisement associated with an application. In some embodiments, the advertisement can include a collection of virtual items 106, which can indicate one or more virtual items that can be purchased. In some embodiments, the virtual items can be items associated with the application corresponding to the advertisement. In some embodiments, the advertisement can be presented at any suitable time (e.g., as a pre-roll advertisement before presentation of a media content item begins, during a presentation of a media content item, at a break in presentation of the media content item, and/or at any other suitable time). In some embodiments, the advertisement can be presented within a portion of a user interface used to present the media content item (e.g., the portion of the user interface used to present a media content item which is presented before, during, and/or after the advertisement).

Logo 102 can be any suitable logo associated with a provider of user interface 100. In some embodiments, logo 102 can include any suitable text, images, icons, graphics, animations, links, and/or any other suitable content. Note that the position of logo 102 in user interface 100 is merely an example, and logo 102 can be located at any suitable position. In some embodiments, logo 102 can be omitted.

Title 104 can be any suitable title for user interface 100. In some embodiments, title 104 can include any suitable text, images, icons, graphics, animations, links, and/or any other suitable content. Note that the position of title 104 in user interface 100 is merely an example, and title 104 can be located at any suitable position. In some embodiments, title 104 can be omitted.

Collection of virtual items 106 can be any suitable collection of indications of virtual items associated with an application corresponding to the advertisement presented in user interface 100. Collection of virtual items 106 can include any suitable number of virtual items (e.g., one, two, five, ten, and/or any other suitable number). Individual virtual items (e.g., virtual item 108) can be arranged in any suitable manner within collection of virtual items 106. For example, as shown in FIG. 1, individual virtual items can be arranged in a column. As another example, in some embodiments, individual virtual items can be arranged in a row, in a grid (e.g., with two or more rows and/or two or more columns), and/or in any other suitable arrangement. Although not shown in FIG. 1, in some embodiments, user interface 100 can include a selectable element, that, when selected, can cause additional and/or alternative virtual items to be presented.

Virtual item 108 can correspond to any suitable virtual item associated with a particular application. For example, in some embodiments, virtual item 108 can correspond to content usable within the particular application. As a more particular example, in instances where the application is a game, virtual item 108 can correspond to content associated with the game (e.g., an extra life in the game, a tool to be used in the game, points, and/or any other suitable item). As another example, in some embodiments, virtual item 108 can correspond to an application related to the particular application. As a more particular example, in instances where the application is a game, virtual item 108 can indicate a related game which is available for purchase. As shown in FIG. 1, in some embodiments, virtual item 108 can include an icon 110, a label 112, a price 114, and a selectable element to purchase 116.

Icon 110 can be any suitable image representing virtual item 108. In some embodiments, icon 110 can include any suitable text, images, graphics, animations, links, and/or any other suitable content. Note that the position of icon 110 relative to other elements of virtual item 108 is merely an example, and icon 110 can be located at any suitable position. In some embodiments, icon 110 can be omitted.

Label 112 can be any suitable label corresponding to virtual item 108. In some embodiments, label 112 can include any suitable text, images, graphics, animations, links, and/or any other suitable content. Note that the position of label 112 relative to other elements of virtual item 108 is merely an example, and label 112 can be located at any suitable position. In some embodiments, label 112 can be omitted.

Price 114 can indicate a price associated with virtual item 108. Price 114 can indicate the price in any suitable format. For example, in some embodiments, the price can be indicated in actual currency (e.g., dollars, cents, and/or any other suitable currency). Additionally or alternatively, in some embodiments, the price can be indicated in a virtual currency associated with the application corresponding to virtual item 108. As a more particular example, in instances where the application is a game, price 114 can indicate a price in a virtual currency associated with the game. Note that the position of price 114 relative to other elements of virtual item 108 is merely an example, and price 114 can be located at any suitable position. In some embodiments, price 114 can be omitted.

Selectable element to purchase 116 can be any suitable input element that can allow a user to indicate that the user wants to purchase virtual item 108. In some embodiments, selectable element 116 can include any suitable user interface components, such as radio buttons, checkboxes, and/or any other suitable user interface components. Additionally, in some embodiments, selectable element 116 can include any suitable text, images, icons, graphics, animations, and/or any other suitable content. Note that the position of selectable element 116 relative to other elements of virtual item 108 is merely an example, and selectable element 116 can be located at any suitable position. In some embodiments, selectable element 116 can be omitted. For example, in some embodiments, one or more of icon 110, label 112, and/or price 114 can be selectable elements, selection of which can indicate that a user wants to purchase virtual item 108. In some embodiments, selectable element 116 can be omitted where user input indicating that a user wants to purchase virtual item 108 can be received from selection of icon 110, label 112, and/or price 114.

Skip advertisement element 118 can be any suitable input element for allowing a user to indicate that the user wants to skip the advertisement being presented in user interface 100. In some embodiments, skip advertisement element 118 can include any suitable text, images, icons, graphics, animations, and/or any other suitable content. Note that the position of skip advertisement element 118 in user interface 100 is shown merely as an example, and skip advertisement element 118 can be located at any suitable position. In some embodiments, skip advertisement element 118 can be omitted.

In instances where the advertisement being presented in user interface 100 is presented within a portion of user interface 100 for presenting a media content item, media player controls, such as rewind element 120, pause element 122, and fast-forward element 124 can be included in user interface 100. In such embodiments, rewind element 120, pause element 122, and/or fast-forward element 124 can be used to control playback of media content presented before and/or after the advertisement. Additionally or alternatively, in some embodiments, media player controls 120-124 can be used to control playback of video and/or audio portions associated with the advertisement. In some embodiments, the media player controls can be disabled and/or hidden during presentation of the advertisement. Furthermore, in some embodiments, additional media player controls not shown in FIG. 1 (e.g., a volume control, a maximize screen control, a time indicator, and/or any other suitable controls) can be included in user interface 100.

Figure 2:
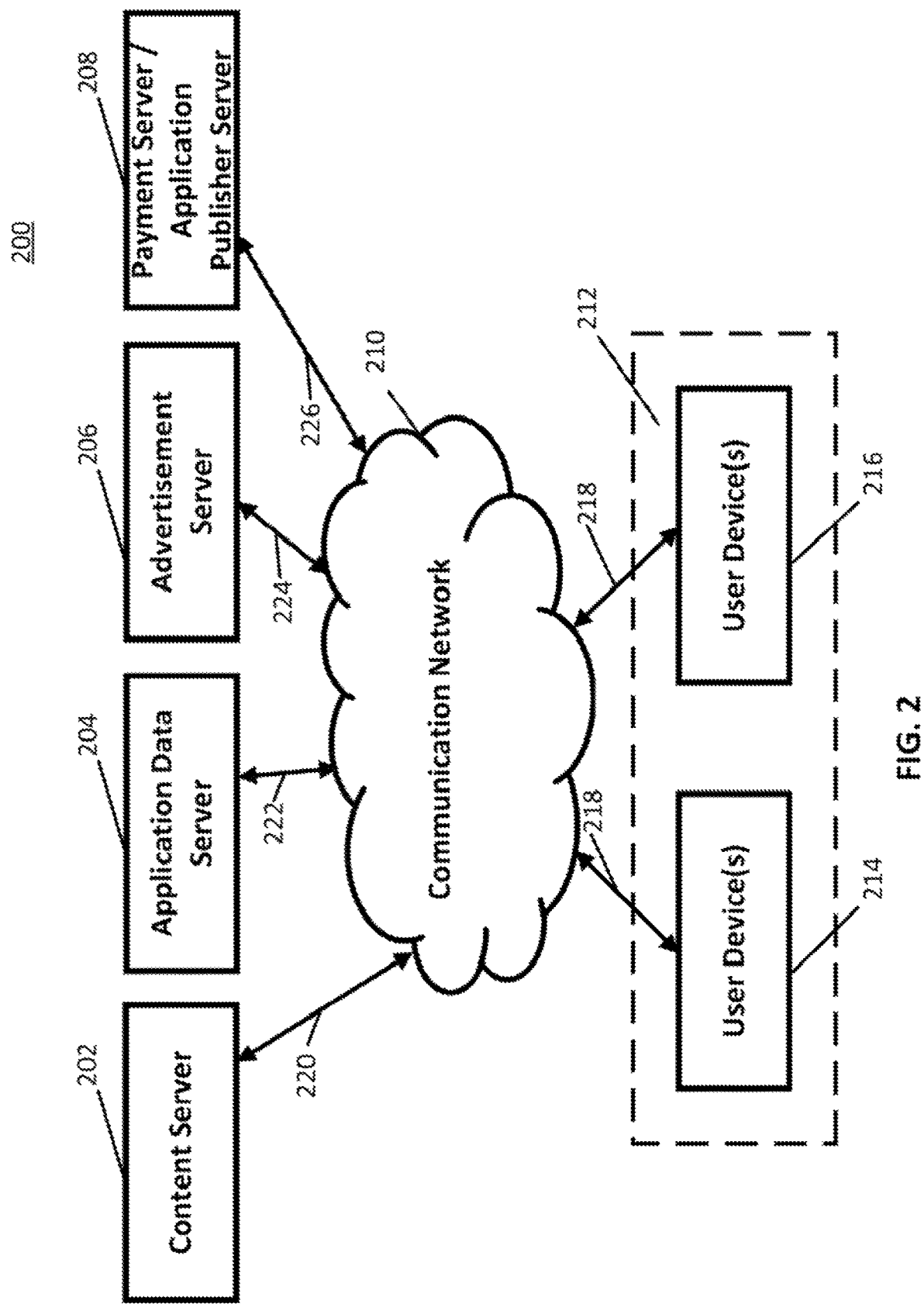
FIG. 2 shows a schematic diagram of an illustrative system suitable for implementation of mechanisms described herein for presenting an advertisement in accordance with some embodiments of the disclosed subject matter.

Turning to FIG. 2, an example 200 of hardware for presenting an advertisement that can be used in accordance with some embodiments of the disclosed subject matter is shown. As illustrated, hardware 200 can include one or more servers such as a content server 202, an application data server 204, an advertisement server 206, and a payment server 208, as well as a communication network 210, and/or one or more user devices 212, such as user devices 214 and 216.

In some embodiments, content server 202 can be any suitable server for storing media content and delivering the content to a user device 212. For example, content server 202 can be a server that streams media content to a user device 212 via communication network 210. Media content provided by content server 202 can be any suitable content, such as video content, audio content, electronic books, documents, images, and/or any other suitable type of media content. As a more particular example, media content can include television programs, movies, cartoons, sound effects, streaming live content (e.g., a streaming radio show, a live concert, and/or any other suitable type of streaming live content), and/or any other suitable type of media content. Media content can be created and uploaded to content server 202 by any suitable entity. In some embodiments, content server 202 can be omitted.

In some embodiments, application data server 204 can be any suitable server for storing and/or transmitting information related to one or more applications. As a more particular example, in some embodiments, application data server 204 can store and/or transmit information related to whether a particular application has been installed on a device associated with a user. As another more particular example, in some embodiments, application data server 204 can store and/or transmit information related to how recently a particular application has been used by an account or device associated with a particular user (e.g., a date the application was last used, a number of days since the application was last used, and/or any other suitable measure). As yet another more particular example, in some embodiments, application data server 204 can store and/or transmit information related to how often a particular application has been used by an account or device associated with a particular user. In some embodiments, application data server 204 can be omitted.

In some embodiments, advertisement server 206 can be any suitable server for storing advertisements, transmitting advertisements, and/or causing an advertisement to be presented. For example, in some embodiments, advertisement server 206 can store one or more advertisements associated with one or more applications. As another example, in some embodiments, advertisement server 206 can determine that an advertisement is to be presented based on information received from application data server 204. As yet another example, in some embodiments, advertisement server 206 can select an advertisement corresponding to a particular application and can transmit the selected advertisement (e.g., to content server 202 and/or user device 212). In some embodiments, advertisement server 206 can be omitted.

In some embodiments, payment server 208 can be any suitable server for processing payment for a virtual item purchased by a user. For example, in some embodiments, payment server 208 can receive payment information (e.g., confirmation that a user entered a correct identification number, and/or any other suitable payment information) from user device 212. As another example, in some embodiments, payment server 208 can update information associated with an application corresponding to the advertisement from which the virtual item was purchased. As a more particular example, in some embodiments, payment server 208 can cause the purchased virtual item(s) to be indicated in an account associated with a user of user device 212. As yet another example, in some embodiments, payment server 208 can transmit a confirmation of an authenticated payment for the purchased virtual item(s) to user device 212, which can subsequently cause the purchased virtual item(s) to be indicated in an account associated with a user of user device 212 (e.g., by transmitting a notification of the successful purchase to application data server 204). In some embodiments, payment server 208 can be omitted.

Communication network 210 can be any suitable combination of one or more wired and/or wireless networks in some embodiments. For example, communication network 210 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 212 can be connected by one or more communications links 218 to communication network 210 that can be linked via one or more communications links (e.g., communications links 220, 222, 224, and/or 226) to content server 202, application data server 204, advertisement server 206, and payment server 208. Communications links 218, 220, 222, 224, and/or 226 can be any communications links suitable for communicating data among user devices 108 and servers 202, 204, 206, and/or 208 such as network links, dial-up links, wireless links, hard-wired links, any other suitable communications links, or any suitable combination of such links.

User devices 212 can include any one or more user devices suitable for requesting content, presenting advertisements, receiving input indicating that a virtual item presented in an advertisement is to be purchased, and/or any other suitable functions. For example, in some embodiments, user devices 212 can be implemented as a mobile device, such as a mobile phone, a tablet computer, a laptop computer, a vehicle (e.g., a car, a boat, an airplane, or any other suitable vehicle) entertainment system, a portable media player, and/or any other suitable mobile device. As another example, in some embodiments, user devices 212 can be implemented as a non-mobile device such as a desktop computer, a set-top box, a television, a streaming media player, a game console, and/or any other suitable non-mobile device.

Although content server 202, application data server 204, advertisement server 206, and payment server 208 are illustrated as separate devices, the functions performed by content server 202, application data server 204, advertisement server 206, and payment server 208 can be performed using any suitable number of devices in some embodiments. For example, in some embodiments, the functions performed by any of content server 202, application data server 204, advertisement server 206, and/or payment server 208 can be performed on a single server. As another example, in some embodiments, multiple devices can be used to implement the functions performed by content server 202, application data server 204, advertisement server 206, and/or payment server 208.

Although two user devices 214 and 216 are shown in FIG. 2 to avoid over-complicating the figure, any suitable number of user devices, and/or any suitable types of user devices, can be used in some embodiments.

Figure 3:
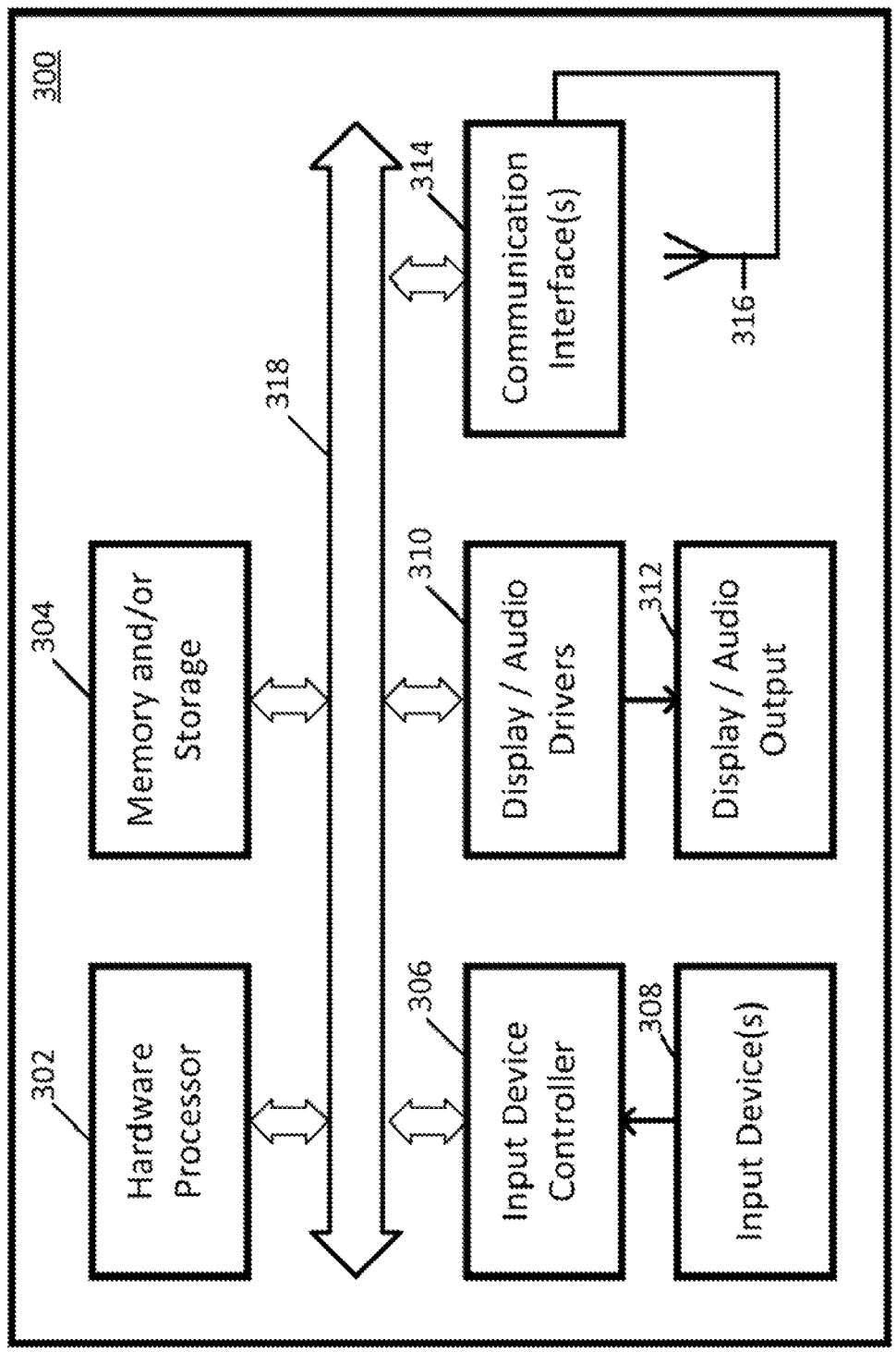
FIG. 3 shows a detailed example of hardware that can be used in a server and/or a user device of FIG. 2 in accordance with some embodiments of the disclosed subject matter.

Content server 202, application data server 204, advertisement server 206, payment server 208, and user devices 212 can be implemented using any suitable hardware in some embodiments. For example, in some embodiments, devices 202, 204, 206, 208, and 212 can be implemented using any suitable general purpose computer or special purpose computer. For example, a mobile phone may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/ audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 302 can be controlled by a server program stored in memory and/or storage 304 of a server (e.g., such as one of servers 202-208). For example, the server program can cause hardware processor 302 to determine whether an advertisement is to be presented, cause an advertisement to be presented on a user device, cause payment information to be collected from the user device, authenticate received payment information, and/or perform any other suitable actions. In some embodiments, hardware processor 302 can be controlled by a computer program stored in memory and/or storage 304 of user device 212. For example, the computer program can cause hardware processor 302 to request a media content item, request an advertisement based on instructions associated with the media content item and/or associated with a user interface for presenting the media content item, cause the media content item and/or the advertisement to be presented, transmit payment information, and/or perform any other suitable actions.

Memory and/or storage 304 can be any suitable memory and/or storage for storing application information, programs, data, media content, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 210 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 206) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

Figure 4A:
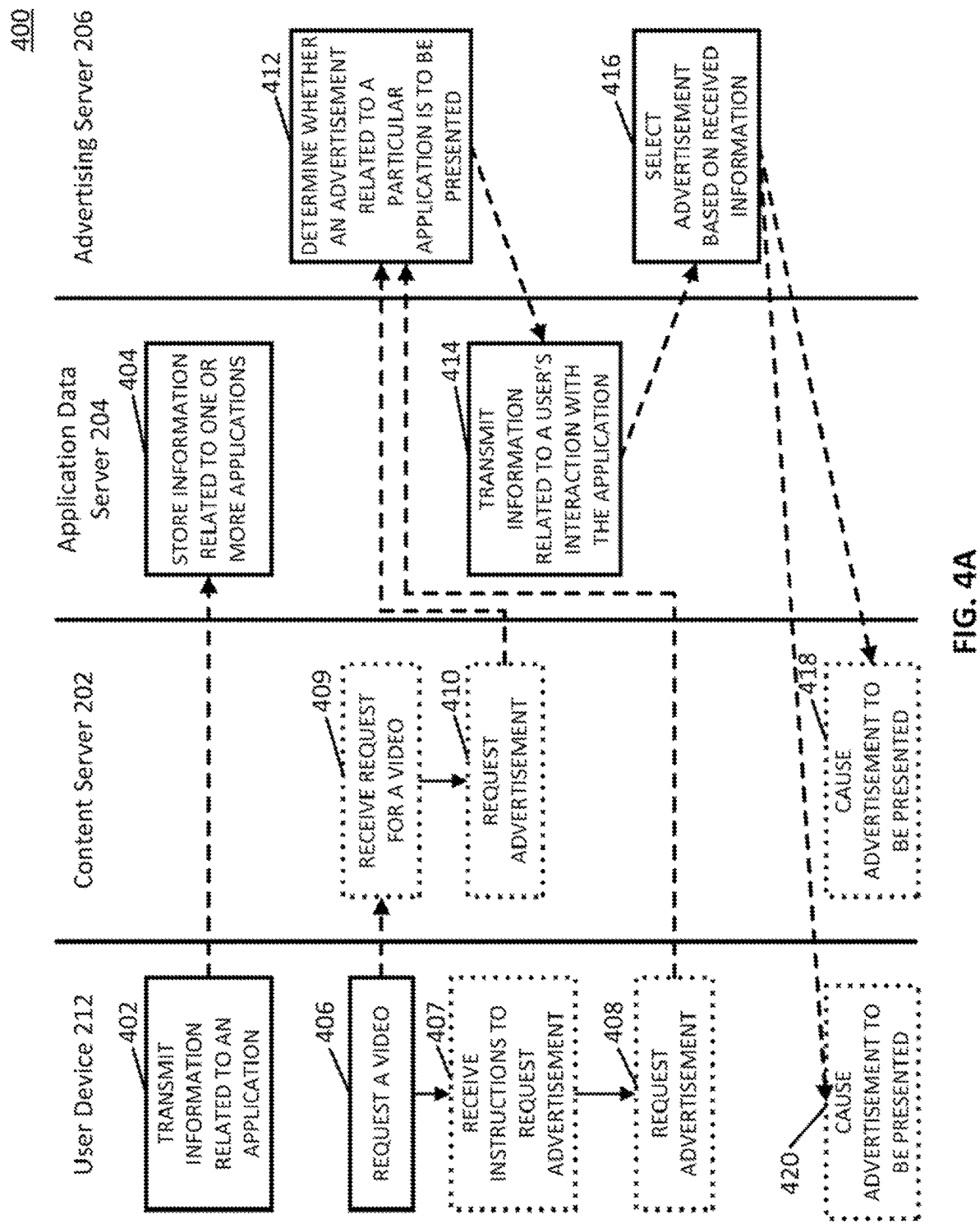
FIG. 4A shows an example of a data flow for presenting an advertisement in accordance with some embodiments of the disclosed subject matter.

FIG. 4A shows an example 400 of a data flow, which can be implemented on multiple devices, for requesting a video, determining whether an advertisement is to be presented, and presenting the advertisement upon determining that an advertisement is to be presented in accordance with some embodiments of the disclosed subject matter.

A user device 212 can begin by transmitting information related to an application installed on user device 212 at 402. In some embodiments, user device 212 can transmit any suitable information, such as identifying information corresponding to an application that was recently installed on user device 212, a time when a particular application was last used by user device 212, a time when a particular application was updated on user device 212, and/or any other suitable information related to one or more applications installed on user device 212. User device 212 can identify the information to be transmitted from any suitable source. For example, in some embodiments, user device 212 can identify the information based on information associated with an account to which a user associated with user device 212 has logged in, from information stored in memory 304 of user device 212, and/or any other suitable source. In some embodiments, user device 212 can transmit the information to application data server 204 via communication network 210.

Application data server 204 can store information related to one or more applications at 404. In some embodiments, application data server 204 can store information received from multiple user devices, including user device 212. Application data server 204 can store the information in any suitable manner. For example, in some embodiments, application data server 204 can store the information sorted according to user identifying information associated with multiple users. As another example, in some embodiments, application data server 204 can store the information sorted according to identifying information of applications.

Note that, in some embodiments, consent from a user can be obtained before transmitting, storing, and/or accessing information related to installation and/or use of a particular application. For example, in some embodiments, consent can be obtained on a per-application basis. As a more particular example, in some embodiments, a user's consent can indicate that information relating to installation and/or use of a particular application can be stored and/or transmitted. In some embodiments, consent can be obtained from a settings menu associated with the particular application, an operating system associated with user device 212, and/or in any other suitable manner.

In some embodiments, blocks 402 and/or 404 can occur at any suitable times and/or frequency. For example, in some embodiments, blocks 402 and/or 404 can occur in parallel with blocks 406-420, as shown in FIG. 4 and described below.

User device 212 can request a media content item at 406 using any suitable technique or combination of techniques. For example, in some embodiments, user device 212 can request the media content item by receiving a user input indicating that presentation of the media content item is to begin (e.g., clicking and/or tapping a play button, and/or any other suitable user input). As another example, in some embodiments, user device 212 can request the media content item by navigating to a particular web site which is configured to begin presenting the media content item upon loading.

In some embodiments, user device 212 can receive instructions that direct user device 212 to request an advertisement at 407. User device 212 can then execute the received instructions at 408 to request the advertisement. For example, in some embodiments, code executing from an embedded media player in a web site on which the requested media content item is to be presented can cause user device 212 to request an advertisement to be presented before the media content item is to be presented. Alternatively, in some embodiments, content server 202 can receive a request for a video at 409. Upon receiving the request, content server 202 can request an advertisement at 410, for example, by transmitting a request to advertising server 206. In some embodiments, content server 202 can be a server hosting and/or serving the requested media content item, and content server 202 can request an advertisement to be presented in association with the requested media content item.

In response to receiving a request for an advertisement, advertising server 206 can determine whether an advertisement related to a particular application is to be presented at 412. For example, in some embodiments, if the requested media content item is related to a particular application, advertising server 206 can determine that an advertisement related to the application is to be presented. In some embodiments, advertising server 206 can identify the particular application based on identifying information of the requested media content item, and/or any other suitable information related to the requested media content. For example, in instances where the requested media content item is related to a particular game, advertising server 206 can identify the application as the game associated with the media content item. In some embodiments, identifying information of the requested media content item can be included in the request for an advertisement, for example, using an identification number specifying a name of the media content item. Advertising server 206 can determine if an advertisement related to the particular application is to be presented using any suitable technique or combination of techniques, for example, as described below in connection with FIG. 5.

As part of determining if an advertisement related to the particular application is to be presented, advertising server 206 can query application data server 204 to request information related to the user's interaction with the particular application. Application data server 204 can transmit information in response to the request at 414. As described below in connection with FIG. 5, the transmitted information can include whether the application has been installed on user device 212, how recently the application has been used by an account or device associated with a particular user, how frequently the application is used by an account or device associated with a particular user, and/or any other suitable information. Additionally, in some embodiments, the transmitted information can include identifying information related to user device 212 (e.g., an identification number, and/or any other suitable identifying information) and/or identifying information related to a user of user device 212 (e.g., a username, and/or any other suitable identifying information).

Advertising server 416 can select an advertisement based on the received information at 416 using any suitable technique, for example, those described below in connection with FIG. 5. In some embodiments, advertising server 416 can transmit the selected advertisement to either content server 202 or user device 212 for presentation.

In some embodiments, content server 202 can cause the advertisement to be presented at 418. For example, in some embodiments, content server 202 can insert the advertisement at any suitable time point relative to presentation of the requested media content item (e.g., before presentation of the media content item, during presentation of the media content item, during a break in the presentation of the media content item, and/or any other suitable time).

Alternatively, in some embodiments, user device 212 can cause the advertisement to be presented at 420. For example, user device 212 can receive the advertisement and cause it to be presented before presentation of the media content item begins, during presentation of the media content item, during a break in the presentation of the media content item, and/or at any other suitable time.

Note that, in some embodiments, user device 212 that transmits information related to an application executing on user device 212 at block 402 can be a different user device from user device 212 that requests media content and/or advertisements at blocks 406, 407, 408, and 420.

Figure 4B:
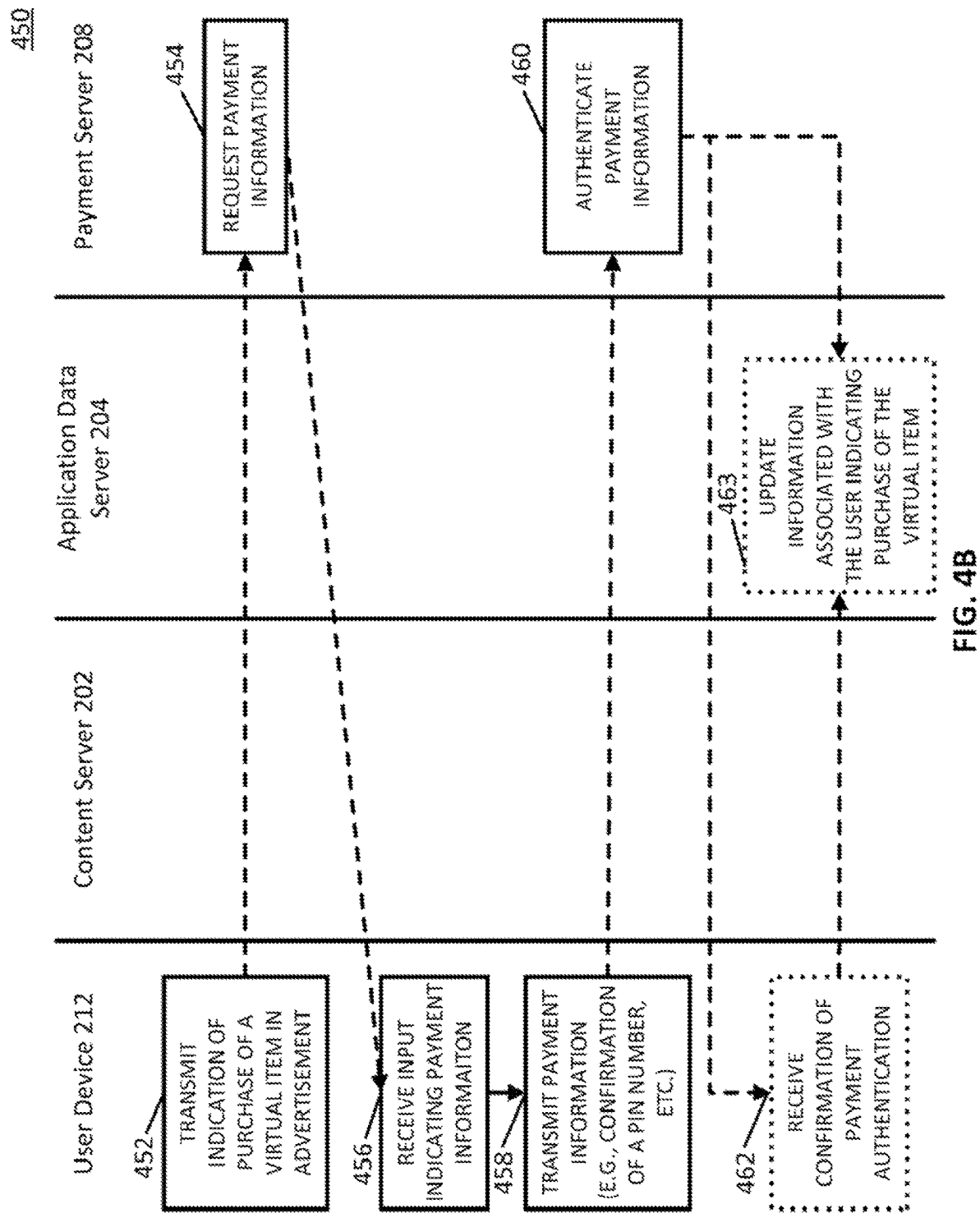
FIG. 4B shows an example of a data flow for processing payment for a virtual item selected from an advertisement in accordance with some embodiments of the disclosed subject matter.

Turning to FIG. 4B, an example 450 of a data flow, which can be implemented on multiple devices, for processing payment for a selected virtual item contained in an advertisement is shown in accordance with some embodiments of the disclosed subject matter.

User device 212 can transmit an indication of a purchase of a virtual item associated with an application related to a presented advertisement at 452. For example, in some embodiments, user device 212 can transmit information indicating that user device 212 has received input which initiates a purchase of a particular virtual item (e.g., by clicking and/or tapping on the virtual item, and/or any other suitable input).

In some embodiments, user device 212 can transmit information related to the purchase to payment server 208. In response to receiving the indication, payment server 208 can request payment information at 454. Payment server 208 can request payment information in any suitable manner. For example, in some embodiments, payment server 208 can cause a user interface requesting user input indicating payment information (e.g., a personal identification number ("PIN"), a password, biometric data, credit card information, and/or any other suitable information) to be opened on display 312 of user device 212.

User device 212 can receive input indicating payment information at 456. For example, in some embodiments, user device 212 can receive input from a keyboard and/or a touchscreen indicating account information, a password, a PIN, biometric data, and/or any other suitable information.

User device 212 can transmit the payment information to payment server 208 at 458. In some embodiments, user device 212 can encode the payment information before transmitting the payment information. For example, in some embodiments, user device 212 can transmit a hash of the payment information. As another example, in some embodiments, user device 212 can verify and/or authenticate the payment information with a value stored in memory 304 of user device 212, and can transmit a confirmation of the user's identity to payment server 208.

Payment server 208 can authenticate the received payment information at 460 using any suitable techniques. For example, in some embodiments, payment server 208 can use techniques described below in connection with FIG. 6.

In some embodiments, after payment information is authenticated, confirmation of the authentication of the payment information can be received by user device 212 at 462. For example, in some embodiments, confirmation can be sent from payment server 208 to user device 212 via communication network 210. In some embodiments, user device 212 can then cause application data server 204 to update information associated with the user indicating successful purchase of the virtual item to be updated at 463. For example, in some embodiments, application data server 204 can credit an account associated with the user and the application with the purchased virtual item(s). Alternatively, in some embodiments, payment server 208 can directly cause application data server 204 to update the information indicating the successful purchase of the virtual item(s), and block 462 can be omitted.

Figure 5:
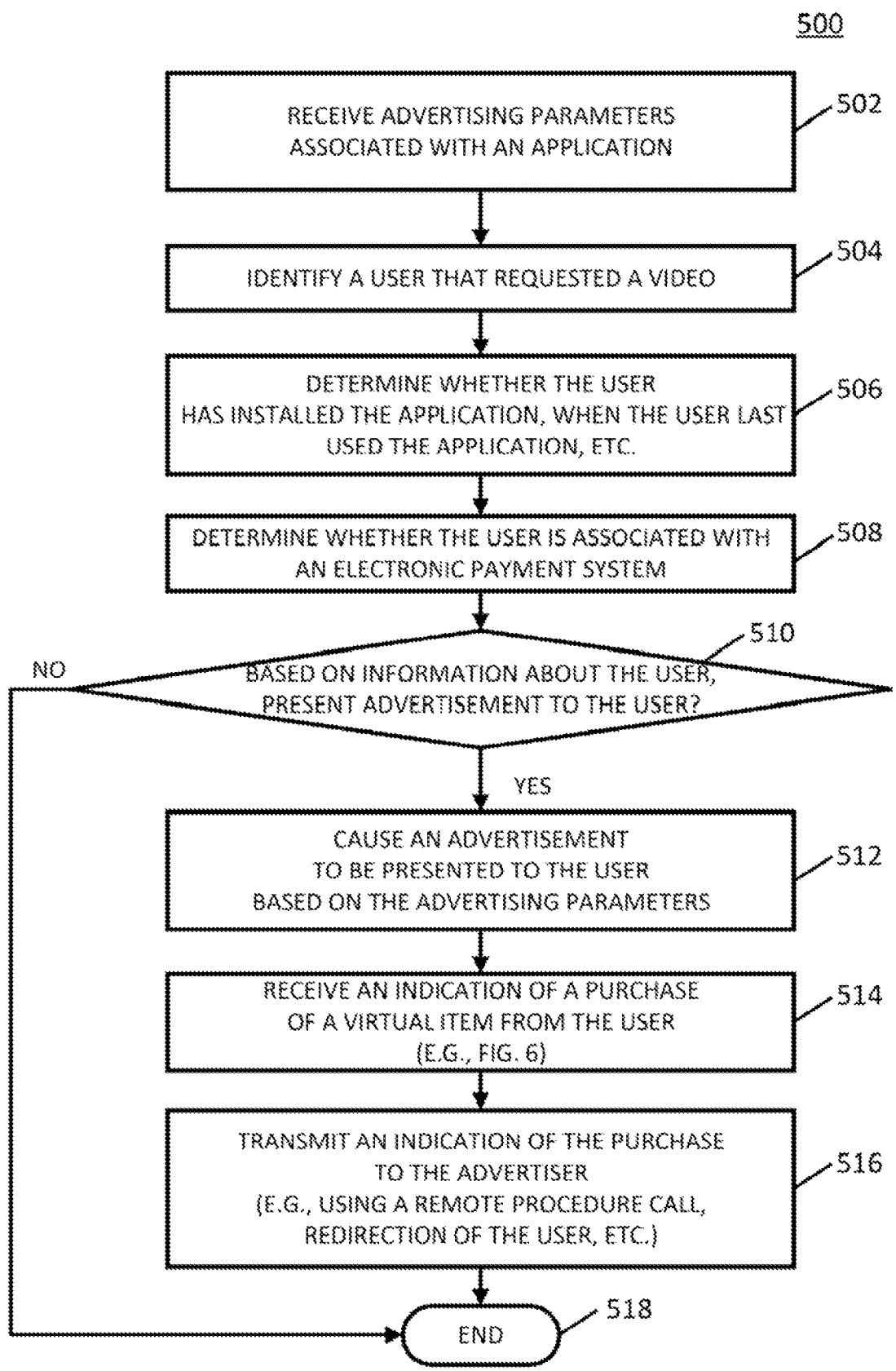
FIG. 5 shows an example of a process for presenting an advertisement based on a user's interaction with an application in accordance with some embodiments of the disclosed subject matter.

Turning to FIG. 5, an example 500 of a process for determining whether to present an advertisement related to an application and for coordinating payment for a purchase of a virtual item indicated in the advertisement is shown in accordance with some embodiments of the disclosed subject matter.

Process 500 can begin by receiving advertising parameters associated with an application at 502. In some embodiments, the advertising parameters can include any suitable information. For example, in some embodiments, the advertising parameters can specify a particular advertisement or a set of advertisements associated with the application (e.g., by specifying one or more identification numbers, each of which correspond to an advertisement). As another example, in some embodiments, the advertising parameters can specify criteria for process 500 to use to determine if an advertisement is to be presented, as described below. As yet another example, in some embodiments, the advertising parameters can include visual characteristics that specify a manner in which virtual items available for purchase are to be presented within an advertisement. As a more particular example, in some embodiments, the visual characteristics can include images, text, selectable elements, and/or any other suitable elements, for example, those shown in and described in connection with FIG. 1 (e.g., icon 110, label 112, price 114, and/or selectable element 116). As another more particular example, in some embodiments, the visual characteristics can include any suitable rendering characteristics associated with the elements corresponding to a virtual item, such as a font, a size of an image, a color of text, and/or any other suitable characteristics. Process 500 can receive the advertising parameters in any suitable manner. For example, in some embodiments, process 500 can receive the advertising parameters from advertising server 206 via communication network 210.

Process 500 can identify a user associated with a request for a media content item at 504 using any suitable technique or combination of techniques and any suitable information. For example, in some embodiments, process 500 can identify the user by identifying an account that is logged in on a web site hosting and/or delivering the media content. As another example, in some embodiments, process 500 can identify the user using a cookie stored in a web browser being used to request the media content item. As yet another example, in some embodiments, process 500 can identify the user through an operating system associated with user device 212. As a more particular example, in some embodiments, process 500 can access identifying information associated with the user that is stored in memory 304 of user device 212 using any particular functions and/or routines associated with the operating system. In some embodiments, process 500 can identify user identifying information, such as a username corresponding to the user that is associated with a particular account (e.g., an account associated with a social networking site, an account associated with a document management system, and/or any other suitable type of account).

Process 500 can determine whether the user has installed an application associated with the requested media content item and the manner in which the application has been used by an account or device associated with a particular user at 506 using any suitable technique or combination of techniques. For example, in some embodiments, process 500 can determine any suitable information indicating times and/or a frequency with which the application has been used by an account or device associated with a particular user. As a more particular example, process 500 can determine a most recent time the application has been used by an account or device associated with a particular user (e.g., a particular date and/or time the application was last used, a number of days and/or hours since the application was last used, and/or any other suitable indication of the most recent time). As another more particular example, process 500 can determine how frequently the application has been used by an account or device associated with a particular user using any suitable metric (e.g., a number of interactions per day, a number of interactions per week, and/or any other suitable frequency metric). As yet another more particular example, process 500 can determine a total number of times the application has been used by an account or device associated with a particular user.

Process 500 can determine whether the application has been installed on a user device associated with the user and information relating to the times and/or frequency with which the application has been used using any suitable technique or combination of techniques. For example, in some embodiments, process 500 can determine whether the application has been installed and/or information relating to interaction with the application using a username identified at 504. As a more particular example, in some embodiments, process 500 can use one or more Application Programming Interfaces (APIs) for authenticating interaction with the application (e.g., to determine a most recent date and/or time the application was last used, and/or any other suitable information). In some embodiments, the one or more APIs can be associated with a particular application publisher, a particular operating system, a particular social networking service, and/or any other suitable entity. As another example, in instances where the application is merely associated with an account corresponding to the user and executed from another application such as a web browser (e.g., rather than being permanently installed on user device 212), process 500 can determine whether the application has been associated with the account, for example, by querying a database containing a list of applications associated with the account.

Process 500 can determine whether the user identified at 504 is associated with an electronic payment system at 508. In some embodiments, process 500 can use the username identified at 504 to determine that the user is associated with a particular electronic payment system. In some embodiments, the electronic payment system can be a payment system that can process any suitable type of payment (e.g., from a credit card, from an account associated with the application, from a bank account, from an account associated with a social networking site, and/or any other suitable type of payment).

At 510, process 500 can determine whether an advertisement is to be presented based on the information determined at 506 and/or 508 using any suitable technique or combination of techniques. For example, in some embodiments, process 500 can determine that an advertisement related to a particular application is to be presented if process 500 determines that the application has been installed on user device 212 and the user is associated with a particular electronic payment system. As another example, in some embodiments, process 500 can determine that an advertisement is to be presented if process 500 determines that the application has been used within a predetermined time period (e.g., within the previous day, within the previous week, and/or any other suitable time period). As yet another example, in some embodiments, process 500 can determine that an advertisement is to be presented if process 500 determines that the application has been used with more than a predetermined frequency (e.g., more than one time per day, more than one time per week, and/or any other suitable frequency). In some embodiments, process 500 can use any suitable combination of criteria to determine if an advertisement is to be presented. In some embodiments, the criteria can be included in the advertising parameters received at 502.

If, at 510, process 500 determines that an advertisement associated with the application is not to be presented ("No" at 510), process 500 can terminate at 518.

Otherwise, if, at 510, process 500 determines that an advertisement associated with the application is to be presented ("Yes" at 510), process 500 can cause an advertisement to be presented based on the advertising parameters at 512 using any suitable technique or combination of techniques. For example, in some embodiments, process 500 can use an identification number included in the advertising parameters to select an advertisement from advertising server 206 that corresponds to the identification number. As another example, in some embodiments, process 500 can cause the selected advertisement to be presented in a portion of a user interface used to present a media content item (e.g., as shown in and described in connection with FIG. 1) as a pre-roll advertisement before presentation of the media content item begins. As a more particular example, in some embodiments, process 500 can cause the selected advertisement to be presented in an embedded media player within a user interface. As shown in FIG. 1, the presented advertisement can include any suitable indications of virtual items available for purchase.

Process 500 can receive an indication that one or more virtual items indicated in the advertisement is to be purchased at 514. Process 500 can receive the indication from any suitable source. For example, in some embodiments, process 500 can receive the indication in response to a determination that selectable element 116 associated with virtual item 108 has been selected, as shown in and described above in connection with FIG. 1. In some embodiments, process 500 can coordinate and/or process payment for the indicated virtual item(s), for example, using the techniques described below in connection with FIG. 6.

Process 500 can transmit an indication of the purchased virtual item at 516 using any suitable technique or combination of techniques. For example, in some embodiments, process 500 can use a remote procedure call (RPC) to transmit information relating to the purchase (e.g., a price at which the virtual item was purchased, a time of purchase, an advertisement from which the virtual item was purchased, and/or any other suitable information) to an entity associated with the application and/or the advertisement. As another example, in some embodiments, process 500 can cause a new web browser, window, or tab to be opened by a user device, or an existing web browser, window, or tab (e.g., a web browser from which the advertisement is being presented) to be redirected to a web site (or other address) associated with the application and/or the advertiser. As a more particular example, in some embodiments, process 500 can use information contained in a portion of a Uniform Resource Locator (URL) to indicate information related to the purchase (e.g., the information described above). As another more particular example, any suitable token can be passed to the web site (or other address) associated with the application and/or advertiser.

Figure 6:
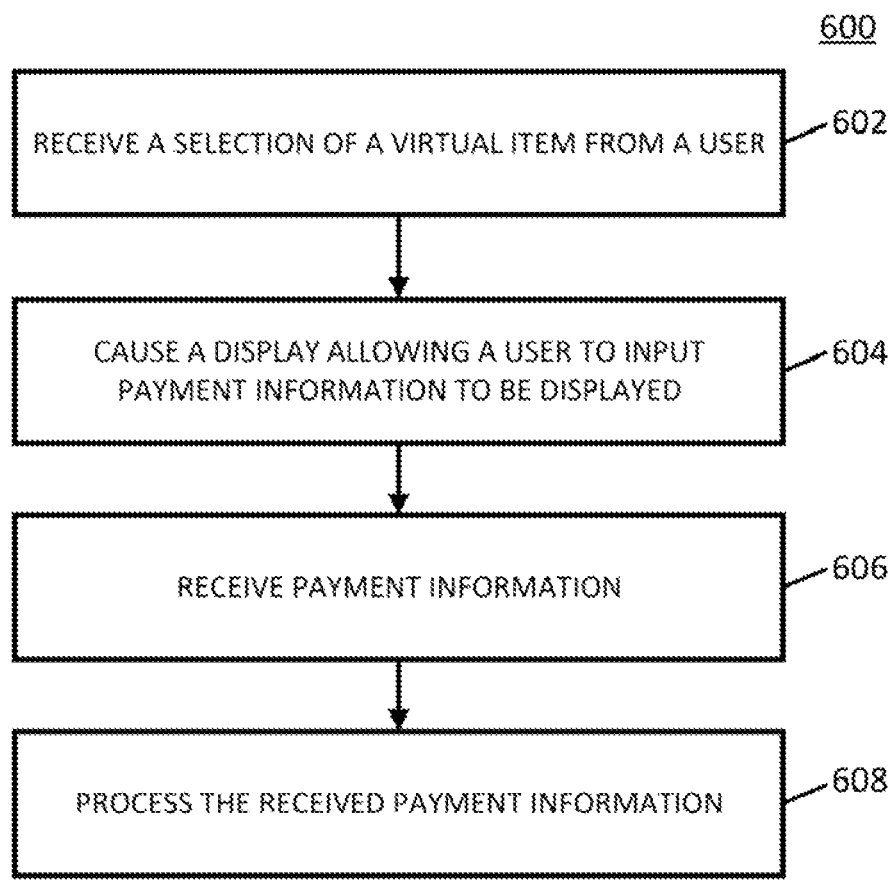
FIG. 6 shows an example of a process for processing payment for a virtual item purchased in an advertisement in accordance with some embodiments of the disclosed subject matter.

Turning to FIG. 6, an example 600 of a process for processing payment for a purchased virtual item is shown in accordance with some embodiments of the disclosed subject matter.

Process 600 can begin by receiving a selection of a virtual item that is to be purchased at 602. In some embodiments, process 600 can receive the selection from user device 212 via communication network 210. In some embodiments, the received selection can additionally indicate an identity associated with a user of user device 212 and/or an identity of an application associated with the selected virtual item. For example, in some embodiments, the received selection can indicate a username of the user, identifying information of the application, such as a name and/or an identification number of the application, and/or any other suitable information.

Process 600 can cause a user interface that instructs a user to input payment information to be presented at 604. For example, in some embodiments, process 600 can cause a window to be presented that prompts a user to enter payment information. In some embodiments, the payment information can include any suitable information for allowing a user to pay for the selected virtual item. For example, in some embodiments, the payment information can include a PIN and/or a password associated with an account (e.g., a bank account, an account associated with the application corresponding to the virtual item, an account associated with a social networking site, an account associated with an electronic payment system, and/or any other suitable account). As another example, in some embodiments, the payment information can include biometric confirmation of the user's identity to allow the payment to be deducted from or charged to an account. As a more particular example, in some embodiments, the payment information can include a fingerprint, which can be detected, for example, from a sensor of user device 212. As yet another example, in some embodiments, the payment information can include information associated with a credit card (e.g., a credit card number, an expiration date, a security number, and/or any other suitable information).

Process 600 can receive the payment information at 606. In some embodiments, the received payment information can be encoded using any suitable security technology. For example, in some embodiments, user device 212 can create a hash of the payment information, and process 600 can receive the hashed payment information. As another example, in some embodiments, user device 212 can perform verification of the user's identity, and can transmit a signal confirming the identity of the user and/or authority to use a particular account. As a more particular example, in some embodiments, user device 212 can compare the user input indicating the payment information to a master version stored in a secure memory location of user device 212, and can transmit a confirmation of the payment information upon verification. As yet another example, in some embodiments, user device 212 can cause the payment information to be encrypted using any suitable technology (e.g., Secure Socket Layer, or "SSL," encryption, and/or any other suitable encryption technology).

Process 600 can process the received payment information at 608. For example, in some embodiments, process 600 can deduct a payment amount from an account specified in the received payment information. As another example, in instances where the purchased virtual item(s) include a second application, process 600 can cause the second application to be downloaded to user device 212. As a more particular example, in some embodiments, process 600 can cause any suitable content (e.g., game pieces, points, lives in a game, and/or any other suitable content) associated with the application to additionally or alternatively become associated with the second purchased application. Note that, in some embodiments, the payment information can specify a virtual currency associated with the application corresponding to the virtual item. For example, in instances where the application is a game, the virtual currency can include points, and/or any other suitable game currency. In such embodiments, process 600 can determine whether an account associated with the user and the application contains sufficient virtual currency to purchase the indicated virtual item, and process 600 can subsequently update the account to deduct virtual currency from the account according to a purchase price of the virtual item.

In some embodiments, at least some of the above described blocks of the processes of FIGS. 4A, 4B, 5, and 6 can be executed or performed in any order or sequence not limited to the order and sequence shown in and described in connection with the figures. Also, some of the above blocks of FIGS. 4A, 4B, 5, and 6 can be executed or performed substantially simultaneously where appropriate or in parallel to reduce latency and processing times. Additionally or alternatively, some of the above described blocks of the processes of FIGS. 4A, 4B, 5, and 6 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for presenting an advertisement to a user, comprising:
receiving, by a system including at least one hardware processor, an advertisement request for an advertisement to be presented in connection with a video presented on a user device, wherein the video includes content related to a first application and wherein the video is presented using a second application installed on the user device;
determining that the first application has been installed on the user device;
determining whether an application specific advertisement should be presented in response to the advertisement request based on application use information indicating that the first application installed on the user device is a frequently used application;
in response to determining that the application specific advertisement should be presented responsive to the advertisement request, causing the application specific advertisement to be presented in connection with playback of the video using the second application, wherein the application specific advertisement includes a user interface for purchasing one or more virtual items associated with the first application;
receiving a user input, via the user interface of the application specific advertisement, indicating a purchase of at least one virtual item of the one or more virtual items;
upon receiving the user input indicating the purchase of the at least one virtual item, facilitating the purchase of the at least one virtual item; and
transmitting information indicating the purchase of the at least one virtual item to an entity associated with the first application.

2. The method of claim 1, wherein the application specific advertisement is presented in connection with the playback of the video based on a determination that the video includes content related to the first application.

3. The method of claim 1, wherein the application specific advertisement is presented in connection with the playback of the video based on a determination that the user account is associated with a particular electronic payment system and wherein the method further comprises facilitating the purchase of the at least one virtual item using the particular electronic payment system.

4. The method of claim 1, wherein the application specific advertisement is presented in connection with the playback of the video based on the determination that the first application has already been installed on the user device.

5. The method of claim 1, wherein the advertisement request includes at least information identifying the video and information identifying a user account and wherein the method further comprising determining that the video includes content related to a second application using at least the information identifying the video.

6. The method of claim 1, wherein transmitting information indicating the purchase of the at least one virtual item comprises sending a remote procedure call.

7. The method of claim 1, wherein transmitting information indicating the purchase of the at least one virtual item comprises redirecting the user to a site associated with the first application.

8. The method of claim 1, further comprising receiving one or more advertising parameters associated with the first application, wherein the one or more advertising parameters indicate the one or more virtual items available for purchase.

9. The method of claim 8, wherein the one or more advertising parameters indicate one or more visual characteristics associated with the one or more virtual items, and wherein the one or more visual characteristics are used in presentation of the one or more virtual items in the application specific advertisement.

10. The method of claim 1, further comprising determining that the user has a virtual currency balance associated with the first application sufficient to purchase at least one of the one or more virtual items.

11. A system for presenting an advertisement to a user, the system comprising:
a hardware processor that is programmed to:
receive an advertisement request for an advertisement to be presented in connection with a video presented on a user device, wherein the video includes content related to a first application and wherein the video is presented using a second application installed on the user device;
determine that the first application has been installed on the user device;
determine whether an application specific advertisement should be presented in response to the advertisement request based on application use information indicating that the first application installed on the user device is a frequently used application;
in response to determining that the application specific advertisement should be presented responsive to the advertisement request, cause the application specific advertisement to be presented in connection with playback of the video using the second application, wherein the application specific advertisement includes a user interface for purchasing one or more virtual items associated with the first application;
receive a user input, via the user interface of the application specific advertisement, indicating a purchase of at least one virtual item of the one or more virtual items;
upon receiving the user input indicating the purchase of the at least one virtual item, facilitate the purchase of the at least one virtual item; and
transmit information indicating the purchase of the at least one virtual item to an entity associated with the first application.

12. The system of claim 11, wherein the application specific advertisement is presented in connection with the playback of the video based on a determination that the video includes content related to the first application.

13. The system of claim 11, wherein the application specific advertisement is presented in connection with the playback of the video based on a determination that the user account is associated with a particular electronic payment system and wherein the hardware processor is further programmed to facilitate the purchase of the at least one virtual item using the particular electronic payment system.

14. The system of claim 11, wherein the application specific advertisement is presented in connection with the playback of the video based on the determination that the first application has already been installed on the user device.

15. The system of claim 11, wherein the advertisement request includes at least information identifying the video and information identifying a user account and wherein the hardware processor is further programmed to determine that the video includes content related to a second application using at least the information identifying the video.

16. The system of claim 11, wherein transmitting information indicating the purchase of the at least one virtual item comprises sending a remote procedure call.

17. The system of claim 11, wherein transmitting information indicating the purchase of the at least one virtual item comprises redirecting the user to a site associated with the first application.

18. The system of claim 11, wherein the hardware processor is further programmed to receive one or more advertising parameters associated with the first application, wherein the one or more advertising parameters indicate the one or more virtual items available for purchase.

19. The system of claim 18, wherein the one or more advertising parameters indicate one or more visual characteristics associated with the one or more virtual items, and wherein the one or more visual characteristics are used in presentation of the one or more virtual items in the application specific advertisement.

20. The system of claim 11, wherein the hardware processor is further programmed to determine that the user has a virtual currency balance associated with the first application sufficient to purchase at least one of the one or more virtual items.

21. A non-transitory computer-readable medium containing computer executable instructions that, when executed by a processor, cause the processor to perform a method for presenting an advertisement to a user, the method comprising:
receiving an advertisement request for an advertisement to be presented in connection with a video presented on a user device, wherein the video includes content related to a first application and wherein the video is presented using a second application installed on the user device;
determining that the first application has been installed on the user device;
determining whether an application specific advertisement should be presented in response to the advertisement request based on application use information indicating that the first application installed on the user device is a frequently used application;
in response to determining that the application specific advertisement should be presented responsive to the advertisement request, causing the application specific advertisement to be presented in connection with playback of the video using the second application, wherein the application specific advertisement includes a user interface for purchasing one or more virtual items associated with the first application;
receiving a user input, via the user interface of the application specific advertisement, indicating a purchase of at least one virtual item of the one or more virtual items;
upon receiving the user input indicating the purchase of the at least one virtual item, facilitating the purchase of the at least one virtual item; and transmitting information indicating the purchase of the at least one virtual item to an entity associated with the first application.

\* \* \* \* \*